U. KAWASAKI.
FOOD GRINDER.
APPLICATION FILED MAR. 16, 1912.
1,068,502.
Patented July 29, 1913.
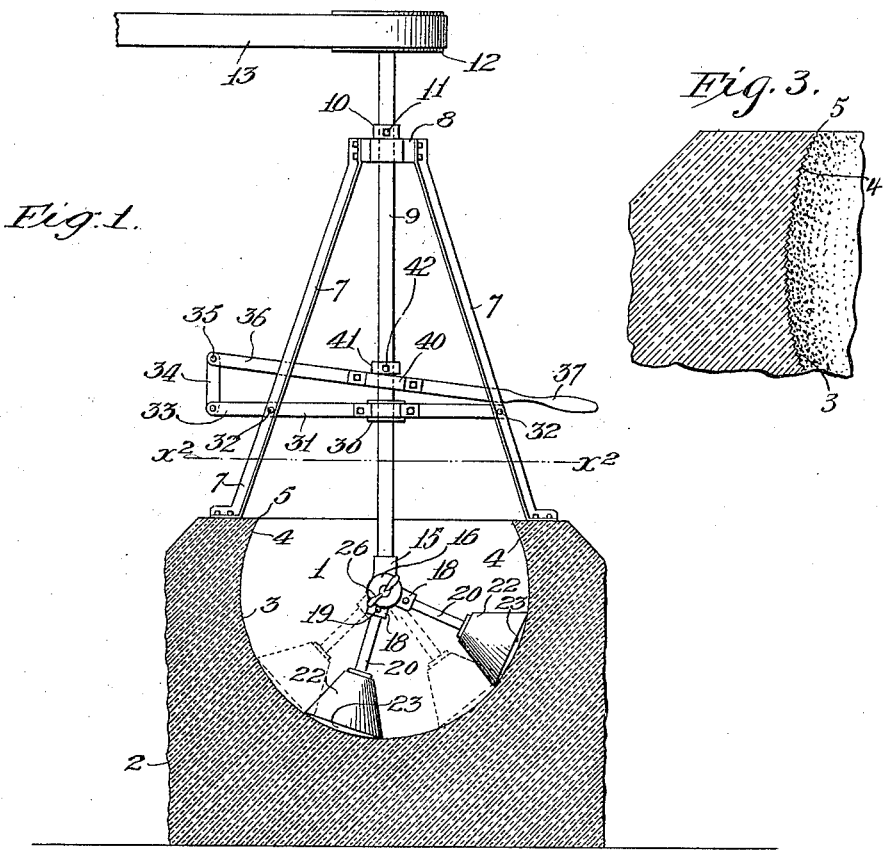
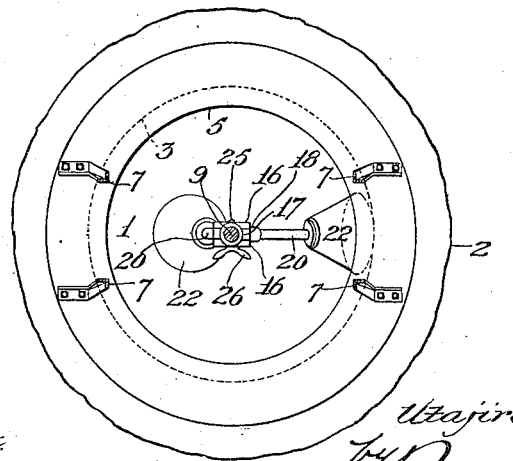
Witnesses:—
Louis W. Gratz.
P. H. Shelton.
Inventor
Utajiro Kawasaki
by Townsend & Graham
his Attorneys
COLUMBIA PLANOGRAPH CO., WASHINGTON, D. C.

UNITED STATES PATENT OFFICE.

UTAJIRO KAWASAKI, OF LOS ANGELES, CALIFORNIA.

FOOD-GRINDER.

1,068,502.   Specification of Letters Patent.   Patented July 29, 1913.

Application filed March 16, 1912. Serial No. 684,318.

*To all whom it may concern:*

Be it known that I, UTAJIRO KAWASAKI, a subject of the Emperor of Japan, residing at Los Angeles, in the county of Los Angeles and State of California, have invented a new and useful Food-Grinder, of which the following is a specification.

My invention relates to a food grinder for preparing edibles for cooking, and is particularly adapted for grinding fish into a pulp so that the same may be made into convenient form for use in making fish cakes or other similar articles of food, and one of the objects of my invention is to produce a machine for grinding food of the character described of simple form and construction which may be efficiently operated for the purposes for which the machine is designed.

Referring to the drawings, which are for illustrative purposes only: Figure 1 is a side elevation, partly in section, of a machine embodying a form of my invention. Fig. 2 is a sectional, plan view on line $x^2$—$x^2$ Fig. 1. Fig. 3 is an enlarged sectional view of a portion of the bowl showing the roughened inner face of the bowl.

The machine comprises a bowl 1 formed by hollowing out a block 2 of concrete, rock or other similar substance. The walls 3 of the bowl are spherical in form and extend inwardly as indicated at 4, the lip 5 of the bowl being of smaller diameter than the central portion of the bowl. In making the bowl, the walls thereof are left in a roughened state for the purposes hereinafter described. Mounted on the upper face of the block 2 are four uprights 7 secured at their upper ends by means of suitable bolts to a head 8, which head 8 forms a bearing for a vertical shaft 9 supported on the head 8 by means of a collar 10 having a suitable pin 11 which extends through the collar and the shaft 9 therein. Mounted on the upper end of the shaft 9 is a pulley 12 adapted to be driven by a belt 13 from any suitable source of power, not shown.

Secured in any suitable manner to the lower end of the shaft 9 is a collar 15 terminating in a pair of jaws 16 adapted to receive and clamp therebetween a plate 17. The plate 17 is provided with a pair of hollow bosses 18, each adapted to have secured therein by means of pins 19 an arm 20. Secured to the lower end of each arm 20 is a beating or grinding means which consists of a head 22 formed of hard wood, in the present instance lignum vitæ. The outer end or face 23 of each head 22 is rounded to conform to the shape of the inner walls of the bowl 1. The heads 22 in general form closely approximate the frustum of a cone, the largest end of the cone terminating in the face 23 just described. The plate 17 may be set in different angular positions in the jaws 16 and may be held in any desired position by means of a set screw 25 provided with handle means 26. The plate 17 is preferably set in the jaws 16 in a position so that the heads 22 when rotated within the bowl each have a different path of movement, as indicated in full line position in Fig. 1, it being understood that the relative position of the heads 22 remains unchanged and that the movement of the plate 17 in the jaws 16 swings both of the heads in unison, a different position of the heads being illustrated in dotted lines in Fig. 1. The shaft 9 is kept in proper alinement so that the heads rotate within the bowl by means of a bearing 30 adapted to engage the shaft 9 above the bowl, which bearing 30 is supported on a brace 31 secured to the standard or upright 7 by means of suitable rivets or bolts 32, one end 33 of the brace 31 extending outwardly from the frame and having pivotally mounted thereto a link 34, to the upper end of which is pivotally mounted at 35 an operating arm 36 having a handle means 37 formed at one end thereof. The operating arm 36 is provided with a strap 40 which passes around the shaft 9 and is adapted to engage the under face of a collar 41 secured to the shaft by means of a suitable pin 42.

The machine is particularly designed for rendering fresh fish to a pulp preparatory to the boiling of the same in the preparation of the fish for use in making fish cakes and similar materials, and in such use the machine is operated in the following manner.

The operating arm 36 is raised by the handle means 37, the strap 40 on the operating arm thereby raising the shaft 9 by means of the collar 41 being engaged by the strap 40 on the operating arm 36. The fish is then placed in the bowl 1 and the operating arm moved downwardly so that the heads 22 come into contact with the fish. The shaft 9 is then rotated through the medium of pulley 12 and belt 13 and the shaft gradually lowered into the mass of fish in the bowl. The rotation of the shaft 9 is continued until the mass of fish in the bowl has become of the proper consistency, after which the machine is stopped and the fish removed from the bowl. During the operation of reducing the fish to the proper consistency, as above referred to, the fish is not only stirred against the roughened sides of the bowl by the beating, as of the heads 22 in their rotative movement, but the fish also is mashed between the faces 23 of the heads 22 and the roughened sides of the bowl, thereby reducing the fish to a pulp. The lip 5 formed on the bowl extends inwardly a sufficient distance so that the rotating action of the heads 22 in the bowl does not throw the contents of the bowl onto the surrounding objects, but directs the contents if thrown toward the center of the bowl so that the contents drops within the bowl.

What I claim is:—

1. A food grinder comprising a bowl, a shaft vertically mounted above said bowl, a plate pivotally mounted in the lower end of said shaft, a plurality of rigid arms secured to said plate, a head on each arm adapted to engage the inner walls of said bowl, means for clamping said plate to said shaft, means for longitudinally raising and lowering said shaft, and means for rotating said shaft.

2. A food grinder comprising a bowl having a rough inner wall, a circular lip on the upper edge of said bowl extending inwardly therefrom, standards secured to said bowl, a shaft vertically mounted in said standards, a pair of rigid arms pivotally mounted in the lower end of said shaft, a head on each arm, means for clamping said head to said shaft, each head having a face thereon adapted to conform to the inner wall of said bowl, means for longitudinally raising and lowering said shaft, and means for rotating said shaft.

3. A food grinder comprising a bowl having a spherical inner face, a circular lip on the upper edge of said bowl extending inwardly therefrom, standards secured to said bowl, a shaft vertically mounted in said standards, a plate pivotally mounted in the lower end of said shaft, a pair of arms secured to said plate, means for securing said plate to the lower end of said shaft, a head on each arm, each head having a face thereon adapted to conform to the inner wall of said bowl, an operating arm pivotally mounted on said standards, a collar on said shaft adapted to be engaged by said arm, and means for rotating said shaft.

4. A food grinder comprising a bowl having a spherical inner face, a circular lip on the upper edge of said bowl extending inwardly therefrom, standards secured to said bowl, a shaft vertically mounted in said standards, a plate, a pair of arms rigidly mounted on said plate extending outwardly therefrom in different directions, means for adjustably securing said plate to the lower end of said shaft, a head on each arm, each head having a face thereon adapted to conform to the inner wall of said bowl, a link pivotally mounted on said standards, an operating arm pivotally mounted to the end of said links, a collar on said shaft adapted to be engaged by said operating arm, and means for rotating said shaft.

In testimony whereof, I have hereunto set my hand at Los Angeles, California, this 7th day of March, 1912.

UTAJIRO KAWASAKI.

In presence of—
Louis W. Gratz,
P. H. Shelton.

---

Copies of this patent may be obtained for five cents each, by addressing the "Commissioner of Patents, Washington, D. C."